United States Patent [19]

Yokochi et al.

[11] Patent Number: 4,990,764

[45] Date of Patent: Feb. 5, 1991

[54] APPARATUS AND METHOD FOR INFORMATION FROM AN INFORMATION CARRIER

[75] Inventors: Toshiyuki Yokochi; Shuko Fujita, both of Tokyo, Japan

[73] Assignee: Kabushiki Kaisha Toshiba, Kanagawa, Japan

[21] Appl. No.: 299,190

[22] Filed: Jan. 19, 1989

[30] Foreign Application Priority Data

Jan. 20, 1988 [JP] Japan .............................. 63-5408[U]
Mar. 9, 1988 [JP] Japan .............................. 63-31435[U]

[51] Int. Cl.$^5$ .......................... H01J 40/14; H04N 1/21
[52] U.S. Cl. .................................... 250/208.1; 358/471
[58] Field of Search ............................. 250/578, 208.1; 358/498, 497, 472, 471

[56] References Cited

U.S. PATENT DOCUMENTS

| | | | |
|---|---|---|---|
| 4,495,409 | 1/1985 | Baji et al. | 250/211 J |
| 4,558,373 | 12/1985 | Plasencia et al. | 358/498 |
| 4,560,866 | 12/1985 | Takenouchi et al. | 250/578 |
| 4,667,244 | 5/1987 | Ishikawa | 358/498 |
| 4,677,495 | 6/1987 | Ito et al. | 358/498 |
| 4,806,775 | 2/1989 | Uchida | 250/578 |

Primary Examiner—David C. Nelms
Assistant Examiner—Michael Messinger
Attorney, Agent, or Firm—Finnegan, Henderson, Farabow, Garrett, and Dunner

[57] ABSTRACT

An information read out apparatus for reading information from an information carrier, the apparatus comprising a transparent medium, transportation rollers for transporting the information carrier at a predetermined distance above the transparent medium, a visible light source for radiating light in a first direction toward the information carrier through the transparent medium, the light being reflected through the transparent medium in a second direction, the reflected light corresponding to an analog representation of information on the information carrier, light detecting means responsive to light reflected from the information carrier through the transparent medium for receiving the reflected light, a guide above the transparent medium and spacer disposed between the guide and the transparent medium for maintaining a predetermined minimum distance between the guide and the transparent medium, the distance being regulated to achieve a resolution above a predetermined level with respect to the information read by the light detecting means.

22 Claims, 4 Drawing Sheets

APPARATUS AND METHOD FOR INFORMATION FROM AN INFORMATION CARRIER

BACKGROUND OF THE INVENTION

1. Field of the Invention

The present invention relates to an information read out apparatus and, more paticularly, to an apparatus and method for reading information from a transferred information carrier with accuracy and without the necessity of strong transferring power for the information carrier.

2. Description of the Prior Art

As is well known, a image read out apparatus of the type using a contact image sensor is used in facsimile transmitters and other image scanners. The typical read out apparatus is shown in FIG. 1 and described in Applicant's Japanese Utility Model Publication No. U57-30673 published on July 6, 1982.

In the typical apparatus, document paper 1 is guided by guide plates 3 and transferred toward a nip between platen roller 2 and transparent plate 4 by transfer rollers not shown. Platen roller 2 is urged by springs toward transparent plate 4 arrow F in FIG. 1 shows the direction of the depression. Platen roller 2 also rotates simultaneously with the transfer rollers to transfer document paper 1, and the transferring speeds of the transfer rollers and platen roller 2 are equal to each other. Light source 5 radiates light to surface 1a of transferred document paper 1 through transparent plate 4 fixed on housing 8 by screws etc. The radiated light is reflected by surface 1a. Self-focusing rod-lens-array 6 receives the reflected light corresponding to information on document paper 1. The length of rod-lens-array 6 is greater than the width (210 mm) of the A4 size document 1 and the height of rod-lens-array 6 is usually 20 mm-50 mm in order to achieve the proper depth of focus. (The greater the height of self-focusing rod-lens-array, the greater the depth of focus.) The focal point A of rod-lens-array 6 is adjusted just on the surface of transparent plate 4. The reflected light from document paper 1 is received by photo-sensitive array 7, such as a CCD (Charge Coupled Device) array, to obtain electrical signals representing one line image. The electrical signals are transported to external circuitry (not shown in FIG. 1) to transmit another facsimile via a telephone line. Light source 5, self-focusing rod lens array 6 and CCD array 7 are arranged in the box comprising a housing and transparent plate 4.

In the typical apparatus, since platen roller 2 is always urged toward transparent plate 4, it contacts transparente plate 4 when paper 1 is not disposed between platen roller 2 and transparent plate 4. The frictional force between platen roller 2 and transparent plate 4 become great when there is no document paper 1 between platen roller 2 and transparent plate 4. This is due to the fact that platen roller 2 is made of rubber making it necessary for the step motor of platen roller 2 to have strong transferring power. Usually, the more the motor has the stronger the transsffering power, the larger and more expensive the motor. Thus, it is difficult to manufacture a compact information reading out device because the motor of the platen roller 2 is large. Using a motor having strong transferring power also increases the cost of production. Further, since document paper 1 always is depressed against transparent plate 4, both surfaces of transparent plate 4 and platen roller 2 tend to become dirty if document paper 1 is stained. If transparent plate 4 become dirty, the light received by CCD array 7 contains an unnecessary image due to the stain. Thus, it is difficult to obtain good quality image light in the typical apparatus. If platen roller 2 and transparent plate 4 become dirty, an operator or a technician needs to remove the stain.

SUMMARY OF THE INVENTION

It is, therefore, the primary object of the present invention to provide a compact and low cost information reading apparatus and method capable of reading information of an information carrier without the necessity of strong transferring power to the information carrier.

It is another object of the invention to provide an information reading out apparatus and method capable of producing a good quality image.

It is a further object of the invention to provide an information reading apparatus and method that dose not become dirty due to a dirty information carrier.

According to the invention, an information reading apparatus and method are capable of reading information from an information carrier transferred in a first direction by transfer rollers rotated by a step motor having weak transferring power. A visible light source radiates light toward the transferred information carrier through a transparent plate, such as a glass plate. The radiated light is reflected by the surface of the transferred information carrier and then received through the transparent plate again by a photo-sensitive array. The reflected light corresponds to information from the information carrier. Thus, the photo-sensitive array reads the information in the form of reflected light at a reading position (focal point). Since the transfer rollers do not contact the reading position, the information carrier does not usually receive the transferring power at the reading position. In the invention, guide means, such as a plastic guide roller, is located above the transparent plate. The space between the transparent plate and guide means is controlled by the space control means and defines a transfer path for the information carrier. The space also is established to achieve a resolution above a predetermined level with respect to the information read. For example, the predetermined level corresponds to about 40% modulation transfer function (contrast transfer function). Thus, since the information carrier having a normal thickness is not depressed against the transparent plate, the transparent plate and guide means do not usually become dirty. Therefore, the step motor for transferring the information carrier does not need as great an amount of transferring power. The photo-sensitive array also receives good quality reflected light excluding the noise light by the stain.

DESCRIPTION OF THE PREFERRED EMBODIMENT

Figure 1:
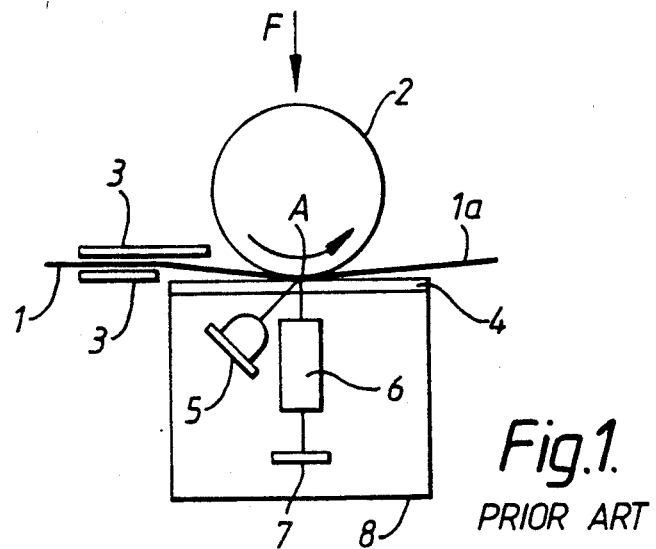
FIG. 1 is a block diagram showing a conventional information reading apparatus.
Figure 2:
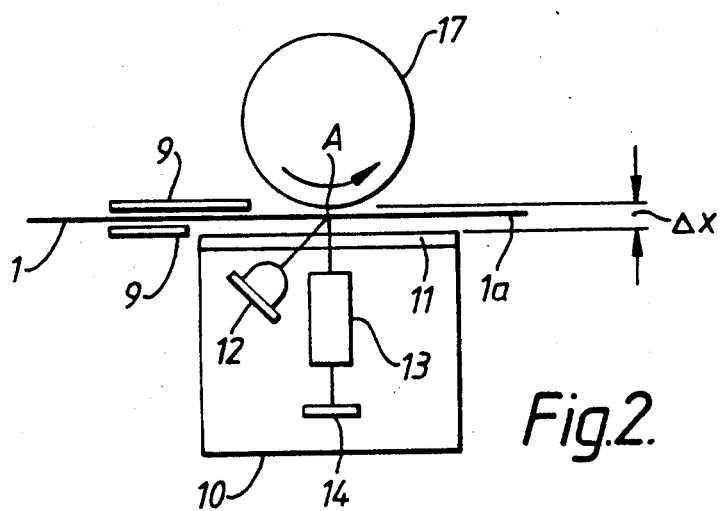
FIG. 2 is a block diagram showing a preffered embodiment of the information reading apparatus according to the invention.
Figure 3:
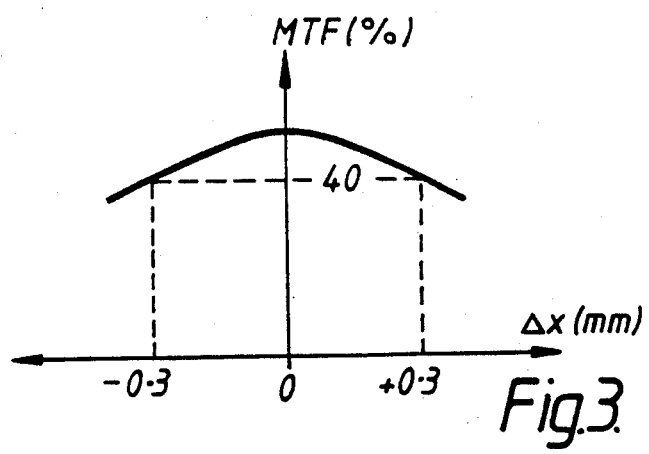
FIG. 3 is a characteristic curve of a modulation transfer function (MTF) of the embodiment shown in FIG. 2.

A preferred embodiment of this invention is shown in FIG. 2 and includes a casing (not shown) in which a set of guide plates 9, transparent glass plate 11 mounted on housing 10 and plastic white guide roller 17 are disposed. For illustrative purposes, the invention is described in a facsimile transmitter. The housing 10 has light emitting diode array 12, self-focusing rod-lens-array 13 and photo-sensitive array 14, such as CCD array, in it. The length of diode array 12, rod-lens-array 13 and CCD array 14 is greater than the width (210 mm) of A4 size document paper 1. The focal point A of rod lens array 13 is adjusted to a middle position between glass plate 11 and guide roller 17. Since there is always about 0.6 mm gaps ($\Delta X$) between glass plate 11 and guide roller 17, the focal point A is adjusted about 0.3 mm above glass plate 11. The gap $\Delta X$ is established to achieve a resolution above a predetermined level with respect to the information read by CCD array 14. FIG. 3 shows the relationship between the gap $\Delta X$ and a modulation transfer function MTF (a contrast transfer function CTF) corresponding to the resolution of the information read. Recently, it has been recognized that there is no problem in obtaining image signals in a facsimile if the MTF is above 40%. Also, a maximum MTF of can be achieved 55% when the information is read just at focal point A in the preferred embodiment. The above gap $\Delta X$ and focal point A are determined by these relationship.

The operation of the facsimile transmitter will now be described. In an initial state (a waiting state), guide roller 17 does not contact glass plate 11. Therefore, gap $\Delta X$ exists between guide roller 17 and glass plate. When the operator sets document paper 1 on a stack and carrier out the transmitting operation, a set of first rollers (not shown) located upstream of guide roller 17, guide roller 17, and a set of second rollers (not shown) located downstream of guide roller 17, begin to rotate simultaneously through a step motor (not shown). Diode array 12 then begin to radiate light. The radiated light is reflected through glass plate 11 by the surface of guide roller 17. The reflected light is received through rod-lens-array 13 by CCD array 14. Since guide roller 17 is white, the reflected light corresponds to a white color. CCD array 14 supplies analog image signals to external processing circuitry in response to the received light. The external processing circuitry converts the analog signals to digital signals and stores the digital signals as reference level signals.

Thereafter, document paper 1 is transferred toward focal point A step by step by the first rollers. After the leading edge of transferred document paper 1 reaches focal point A, the light from diode array 12 is reflected through glass plate 11 by surface 1a of document paper 1. The reflected light is received by rod-lens-array 13 through glass plate 11. The reflected light represents or includes image information from surface 1a. CCD array 14 converts the received light to analog image signals and supplies them to the external processing circuitry. The external processing circuitry controls the gain of the received analog signal by the prestored reference level signals. Thereafter, the external processing circuitry converts the processed analog image signals to digital signals, codes the digital signals, and modulates the coded signals. The modulated signals are then transmitted to a facsimile receiver. Document paper 1 is further transferred forward by the first rollers as the leading edge of document paper 1 moves towards the second rollers. The second rollers transfers document paper 1 to an exit. When the tail edge of document paper 1 is passed focal point A, the image reading operation of document paper 1 is completed.

In the image reading operation, document paper 1 is passes between glass plate 11 and guide roller 17. In this state, document paper 1 is not depressed by guide roller 17 because the gap $\Delta X$ between glass plate 11 and guide roller 17 is wider than the thickness of document paper 1. Usually, the thickness of document paper 1 is about 0.008 mm–0.006 mm. Also, since the surface of guide roller 17 has smooth surface and guide roller 17 rotates simultaneously with the first rollers, document paper 1 is passes the gap $\Delta X$ smoothly to prevent document paper 1 from clogging in the gap $\Delta X$. Further, since transferred document paper 1 is not depressed to glass plate 11 and/or guide roller 17, they do not become dirty even if document paper 1 has some stain. Therefore, the reference level signals obtained by the clean surface of guide roller 17 is always of good quality.

Figure 4:
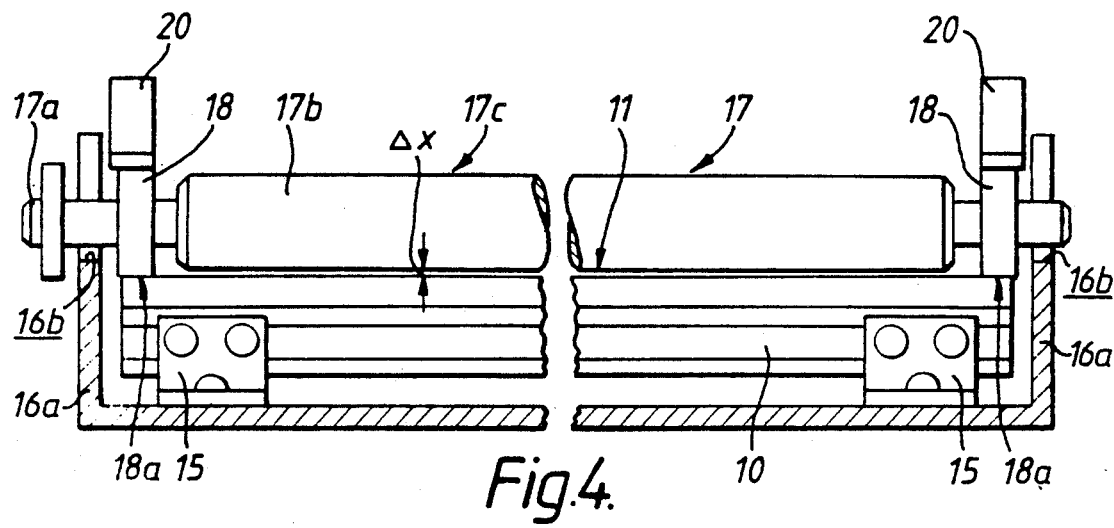
FIG. 4 is a partial cross-sectional front view of the information reading apparatus depicted in FIG. 2.
Figure 5:
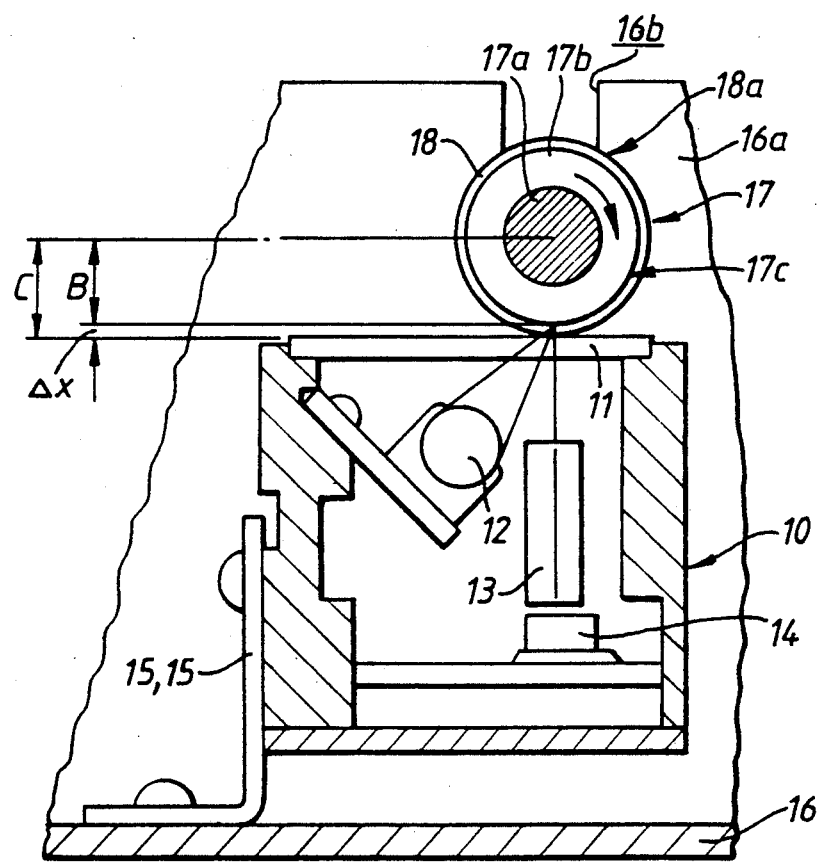
FIG. 5 is a cross-sectional side view of the embodiment depicted in FIG. 2.

The structure of the image reading out apparatus is shown in FIGS. 4 and 5. FIG. 5 includes a cross-sectional view of FIG. 4. Housing 10 including diode array 12, rod-lens-array 13 and CCD array 14, is to plates 15 and screws. Diode array 12 is mounted on a small printed circuit board fixed housing 10 by screws. CCD array 14 is also mounted on a another small printed circuit board fixed housing 10 by screws.

Of course, rod-lens-array 13 and glass plate 11 are fixed to housing 10. Casing 16 includes two side plates 16a having U-shaped grooves 16b. The grooves 16b correspond to axle 17a of guide roller 17 to prevent axle 17a from moving frontward and rearward. Plastic rollers 18 having smooth surfaces are fixed axle 17a of guide roller 17 between guide roller 17 and side plates 16a and are rotated as coaxial rollers with glass roller 17. The rollers 18 are also located on the side portion of the glass plate 11 and are depressed against glass plate 11 by respective springs 20. Both sides of axle 17a are located beyond side plates 16a through grooves 16b. A gear is further fixed a left side of axis 17a located beyond side plate 16a to transmit the rotating power from a step motor. The radius of both rollers 18 are the same and are bigger than the radius of guide roller 17. When rollers 18 contact glass plate 11 through the bias of springs 20, a gap $\Delta X$ between guide roller 17 and glass plate 11 appears. The gap $\Delta X$ is equal to the difference between the radius of guide roller 17 and the radius of rollers 18. Of course, guide roller 17 has a smooth white surface 17c to obtain the reference level signals and reduce the coefficient of friction.

When normal document paper 1 is transferred between guide roller 17 and glass plate 11, document paper 1 passes through the gap $\Delta$ smoothly because the gap $\Delta X$ is wider than the thickness of document paper 1. Thus, document paper 1 is not depressed against glass plate 11 or guide roller 17. On other hand, if an irregular document paper 1 having the thickness which is wider than the gap ΔX, is transferred to between guide roller 17 and glass plate 11, document paper 1 moves up guide roller 17. In this state, document paper 1 is depressed against glass plate 11 by springs 20. According to this apparatus, rollers 18 do not contact with document paper because the width of document paper 1 is narrower than the distance between rollers 18.

Figure 6:
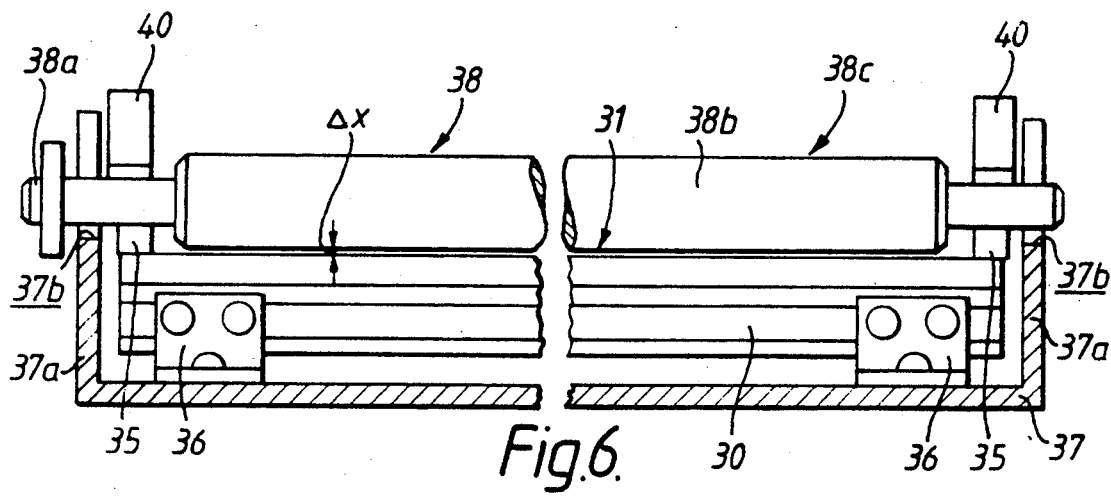
FIG. 6 is a partial cross-sectional front view of a second information reading apparatus according to the invention.
Figure 7:
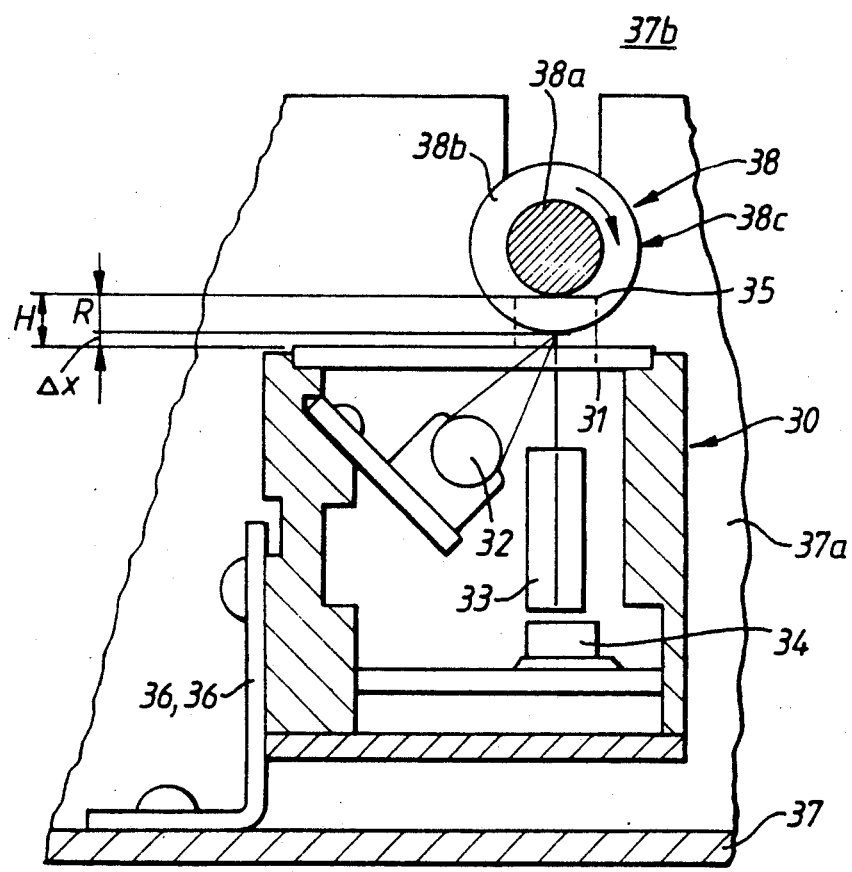
FIG. 7 is a cross-sectional side view of the embodiment shown in FIG. 6.
Figure 8:
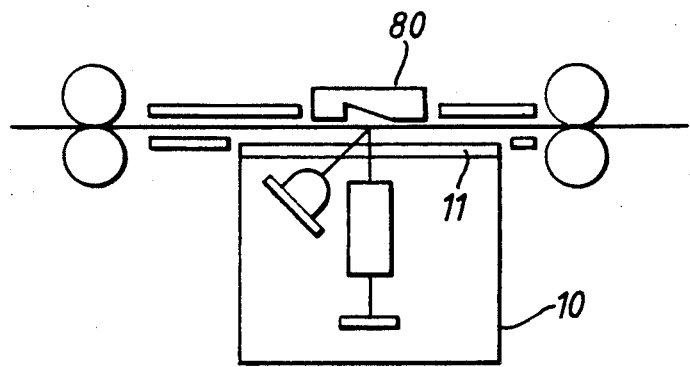
FIG. 8 is a structual drawing of a third embodiment of an information reading apparatus according to the invention.

The second embodiment of the image reading out apparatus is shown in FIGS. 6 and 7. FIG. 7 is a cross-sectional view of FIG. 6. In this embodiment, spacers 35 is arranged on glass plate 11 instead of rollers 18 described above. Spacers 35 are fixed on both side of glass plate 11. The distance between spacers 35 is wider than the width of document paper 1. The side portions of axile 38a of guide roller 38 is depressed against spacers 35 respectively by respective springs 40. Spacers 35 support guide roller 38, maintaining the gap ΔX. Both sides of axile 38a are located in grooves 37b of casing 37. Housing 30 including diode array 32, rod-lens-array 33 and CCD array 34, is fixed to casing 37 by L-shaped plates 36 and screws.

When a normal document paper 1 is transferred between guide roller 17 and glass plate 11, document paper 1 passes through the gap ΔX smoothly because the gap ΔX is wider than the thickness of document paper 1. On other hand, if an irregular document paper 1 having the thickness which is wider than the gap ΔX, is transferred to between guide roller 17 and glass plate 11, document paper 1 moves guide roller 17 upward.

Additional structure of the image reading apparatus is shown in FIGS. 4 and 6. In this embodiment, plastic white guide plate 80 is arranged 0.6 mm above glass plate 11. Guide plate 80 has an indentation having a sloping portion adapted to reflect the radiated light toward CCD array. The sloping portion has a smooth surface to reduce the coefficient of friction.

According to the above first and second embodiments shown in FIGS. 4 and 6, guide rollers 17 and 38 are rotated simultaneously with other transfer rollers. However, additional structure of guide rollers 17 and 38 may be free rollers for transporting document paper 1 when it strikes the rollers, to prevent document paper 1 from clogging in the gap ΔX.

Various changes may be made within the purview of this invention in the form, detalis, proportions and arrangement of parts without departing from the spirit of the invention, and no undue limitations are to be inferred or implied from the foregoing disclosure.

We claim:

1. An information read out apparatus for reading information from an information carrier, the apparatus comprising:

a transparent medium;

transportation means for transporting the information carrier at a predetermined distance above said transparent medium;

a visible light source for radiating light in a first direction toward said information carrier through said transparent medium, said light being reflected through said transparent medium in a second direction, said reflected light corresponding to an analog representation of information on the information carrier;

light detecting means responsive to light reflected from said information carrier through said transparent medium, for receiving said reflected light;

guide means for cooperating with said transparent medium to define a transportation path above said transparent medium; and space control means disposed between said guide means and said transparent medium for maintaining a predetermined minimum distance between said guide means and said transparent medium, said distance being regulated to achieve a resolution above a predetermined level with respect to said information represented by said light received by said light detecting means.

2. An information read out apparatus according to claim 1, wherein said predetermined resolution level corresponds to about 40% modulation transfer function.

3. An information read out apparatus according to claim 1, wherein said transportation means is disposed to transport said information carrier along a path at the mid-point between said guide means and said transparent medium.

4. An information read out apparatus according to claim 1, wherein said guide means comprises a platen roller.

5. An information read out apparatus according to claim 4, wherein said platen roller has a smooth surface to reduce the coefficient of friction.

6. An information read out apparatus according to claim 4, wherein said transportation means comprises a transfer roller and said platen roller rotates simultaneously with said transfer roller thereby preventing said transported information carrier from clogging in the transfer path.

7. An information read out apparatus according to claim 4, wherein said platen roller is white for establishing a basic light level for the reflected light.

8. An information read out apparatus according to claim 4, wherein said platen roller rotates freely to prevent said transferred information carrier from clogging in the transfer path when said information carrier contacts said platen roller.

9. An information read out apparatus according to claim 4, wherein said platen roller includes a first roller, said space control means includes second and third rollers arranged respectively at the ends of said first roller, said first, second, and third rollers having a common axis, and wherein said space is defined by the difference between the radius of said first roller and the radii of said second and third rollers.

10. An information read out apparatus according to claim 9 further including spring means for urging said second and third rollers toward said transparent medium.

11. An information read out apparatus according to claim 9, wherein said first roller is white for establishing a basic light level for the reflected light.

12. An information read out apparatus according to claim 4, wherein said platen roller includes a first roller and said space control means includes spacers located at each respective end of said first roller for supporting said first roller a predetermined distance above said transparent medium.

13. An information read out apparatus according to claim 12, wherein said platen roller further comprises an axle and a plurality of springs disposed at ends at said first roller and wherein said axle is depressed toward said spacers by said spring.

14. An information read out apparatus according to claim 12, wherein said first roller is white for establishing a basic light level for the reflected light.

15. An information read out apparatus accoridng to claim 1 wherein said guide means comprises a guide plate.

16. An information read out apparatus according to claim 15, wherein said guide plate has smooth surface for reducing the coefficient of friction.

17. An information read out apparatus according to claim 15, wherein said guide plate has an indentation positioned on a surface thereof opposite said transparent medium.

18. An information read out apparatus according to claim 17, wherein said indentation has a sloping portion for reflecting the radiated light toward said light detecting means.

19. An information read out apparatus according to claim 17 wherein said indentation has a white surface for establishing a basic light level for the reflected light.

20. A method for reading information from an information carrier, the method comprising the steps of:
- transporting the information carrier in a first direction;
- radiating light toward said transported information carrier through a transparent medium;
- detecting light reflected from said information carrier through said transparent medium;
- reading information from said information carrier based on said detected light;
- guiding said information carrier through a space defined by said guide means and said transparent medium at a predetermined distance above said transparent medium; and
- controlling said space to achieve a resolution above a predetermined level with respect to the information read.

21. An information read out apparatus for reading information from an information carrier, the apparatus comprising:
- a transparent medium;
- transportation means for transporting the information carrier at a predetermined distance above said transparent medium;
- a visible light source for radiating light in a first direction toward said information carrier through said transparent medium, said light being reflected through said transparent medium in a second direction, said reflected light corresponding to an analog representation of information on the information carrier;
- light detecting means responsive to light reflected from said information carrier through said transparent medium, for receiving said reflected light;
- guide means for cooperating with said transparent medium to define a transportation path above said transparent medium, said guide means being adjustable to accommodate information carriers of a plurality of thicknesses; and
- space control means disposed between said guide means and said transparent medium for maintaining a predetermined minimum distance between said guide means and said transparent medium, said distance being regulated to achieve a resolution above a predetermined level with respect to said information represented by said light received by said light detecting means.

22. A method for reading information from an information carrier, the method comprising the steps of:
- transporting the information carrier in a first direction;
- radiating light toward said transported information carrier through a transparent medium;
- detecting light reflected from said information carrier through said transparent medium;
- reading information from said information carrier based on said detected light;
- guiding said information carrier through a space defined by said guide means and said transparent medium at a predetermined distance above said transparent medium;
- controlling said space to achieve a resolution above a predetermined level with respect to the information read; and
- increasing the space between said guide means and said transparent medium when the thickness of the information carrier is greater than that of said space.

* * * * *